United States Patent [19]

Pramstraller

[11] 4,050,813

[45] Sept. 27, 1977

[54] LAMP-ADJUSTING MECHANISM, PARTICULARLY FOR PHOTOGRAPHIC ENLARGING APPARATUS

[75] Inventor: Wilmuth Pramstraller, Brixen, Italy

[73] Assignee: Durst AG. Fabrik Fototechnischer Apparate Bozen, Blzano-Bozen, Italy

[21] Appl. No.: 645,939

[22] Filed: Jan. 2, 1975

[30] Foreign Application Priority Data

Jan. 10, 1975   Italy .................................... 6701/75

[51] Int. Cl.² ...................... G03B 27/54; F21V 19/02
[52] U.S. Cl. ...................................... 355/67; 362/287
[58] Field of Search .............. 240/44.2, 44.26, 61.6, 240/61.8, 44; 353/87; 355/67

[56] References Cited

U.S. PATENT DOCUMENTS

| 1,507,095 | 9/1924 | Uhlemann | 240/44 |
| 1,729,610 | 10/1929 | Coulter | 240/44.2 |
| 1,852,804 | 4/1932 | Cocksedge | 240/44.2 |
| 3,510,220 | 5/1970 | Bures | 240/44.2 |
| 3,700,884 | 10/1972 | Fujimoto | 240/44.2 |
| 3,886,350 | 5/1975 | Katsukura et al. | 240/44.2 |

Primary Examiner—Donald A. Griffin
Attorney, Agent, or Firm—Connolly and Hutz

[57] ABSTRACT

A mechanism, for adjusting the position of an illuminating lamp longitudinally and angularly in planes perpendicular to the optical axis of the condenser, has a lead screw and guide rod mounted substantially parallel to each other on the housing. The lamp socket holder is longitudinally traversed by the lead screw and the guide rod is eccentrically adjusted to impart a tilting movement to the holder. Control knobs for the lead screw and tilting mechanism are disposed adjacent each other on the outside of the housing. The lamp socket may also be axially and rotatably adjusted in the holder.

7 Claims, 4 Drawing Figures

U.S. Patent    Sept. 27, 1977    4,050,813
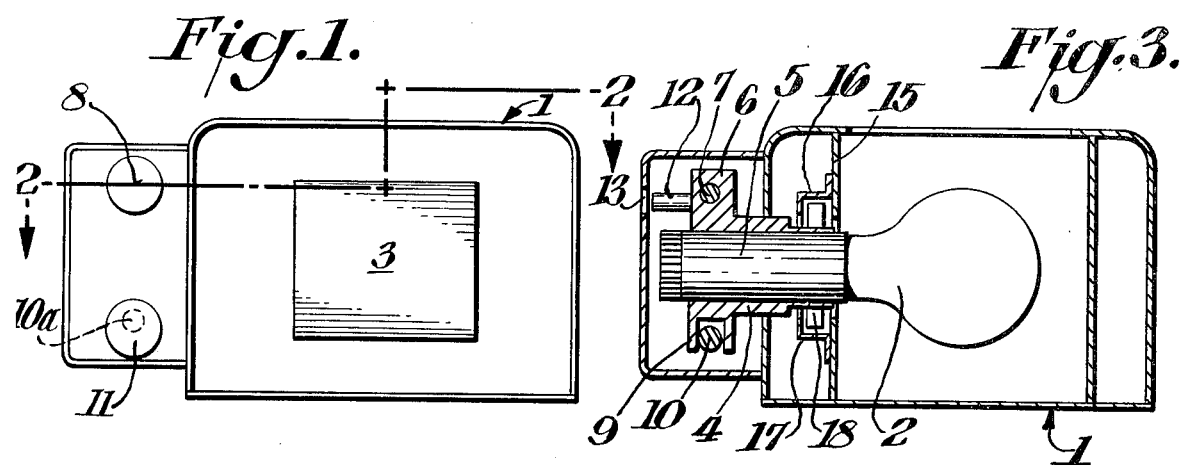
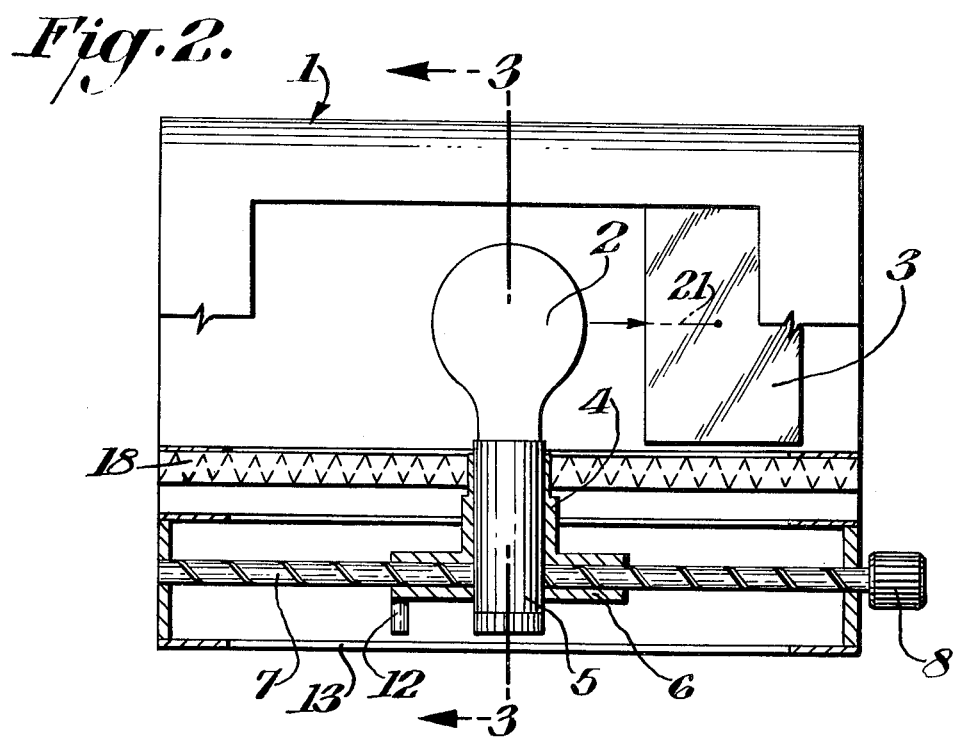
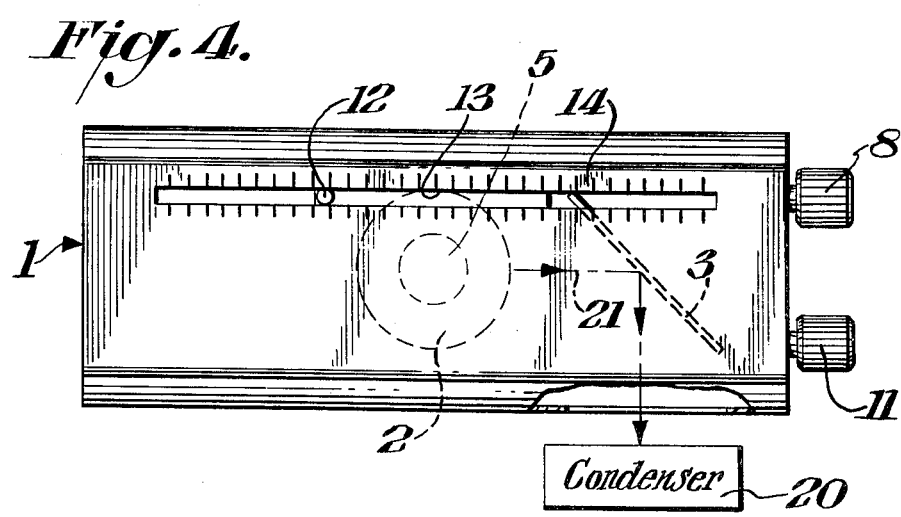

LAMP-ADJUSTING MECHANISM, PARTICULARLY FOR PHOTOGRAPHIC ENLARGING APPARATUS

BACKGROUND OF THE INVENTION

This invention relates to a lamp-setting mechanism, particularly for photographic enlarging apparatus having a condenser-illuminating system.

For the copying of transparent, non-self-illuminating original copies, illuminating systems with condensers are employed in many apparatus, e.g. in photographic enlarging apparatus. In order to achieve an optimum illumination of the original copies at all copying scales, it is necessary to change the distance between the light source and the copying optics employed at a given time. This generally occurs by moving the light source relative to the condenser. Since the copying scale in enlarging apparatus is variable within wide limits, wherein additionally copying optics with varying focal lengths come into play, there results a relatively large adjusting range for the light source.

For the optimum illumination of the original copies, it is necessary, furthermore, that the filament and the bulb, respectively, of the light source be situated in a precisely determined position opposite the optical axis of the condenser.

A number of photographic enlarging apparatus provide for a follow-up and/or centering device for the light source within the illuminating system, so that their precise conformance to the particular optical conditions is made possible.

The known follow-up and centering devices, however, are suitable only for an occasional adjustment of the light source, because the respective controls are accessible only with difficulty and an adjustment is thus inconvenient. However, if point light sources are used in the illuminating system for the achievement of the greatest possible contrast, a change in the distance of the light source relative to the condenser is necessary in any change in the scale of enlargement, should optimum results be achieved.

A new centering of the light source is equally necessary with each new distance adjustment, because the respective guiding units within the illuminating system cannot be constructed because of cost reasons with the necessary great precision, and the optical axis of the condenser can be considered only within certain limits as precisely parallel to the course on which the light source is adjusted.

The object of the invention is to provide a lampsetting mechanism for a condenser illuminating system wherein the distance change and centering of the light source as compared to the condenser is related to the greatest possible comfort of operation.

SUMMARY

This object is achieved by a lamp-setting mechanism, which is characterized in that a light source, mounted in a holder for the changing of distance relative to the condenser along a guiding unit, may be adjusted essentially parallel to the optical axis of the condenser, and for the centering is normally tiltable in an optical plane thereto.

The novel lamp-setting mechanism may be constructed in an advantageous manner so that a follow-up and a centering of the light source may take place from the front of an apparatus with a condenser illuminating system. Since in modern apparatus, other controls are also reachable from the front, the novel design offers a great advantage in operating over known apparatus of the above-mentioned type.

In a further development of the invention, the position of the light source is indicated in the housing of the illuminating device, something which is of a particular advantage for repetitive operations of an enlarging apparatus and, in addition, allows a rough setting of the light source by way of a suitable calibrated tabulation wherein the respective setting of the light source is coordinated to the individual scale of magnification without having to visually check the illumination.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which:

FIG. 1 is a front view in elevation of the illuminating section of a photographic enlarging apparatus with a novel lamp-adjusting mechanism which is one embodiment of this invention;

FIG. 2 is a cross-sectional view taken through FIG. 1 along the line 2—2;

FIG. 3 is a cross-sectional view taken through FIG. 2 along the line 3—3; and

FIG. 4 is a side view in elevation of the lamp-adjusting mechanism shown in FIGS. 1-3.

DESCRIPTION OF THE PREFERRED EMBODIMENTS

In lamp housing 1 of an enlarging apparatus, not further illustrated, there is arranged a light source 2 in a horizontal installation. The light emanating from light source 2 is deflected in a known manner by a reflector 3 and conducted to a condenser 20, which is schematically illustrated. Light source 2 is mounted in a holder device, which consists of a socket holder 4 and a lamp socket 5 inserted therein, said socket being turnable about its longitudinal axis within the socket holder 4 and is movable in a limited extent in the direction of its longitudinal axis. By turning and moving the lamp socket 5 within the socket holder 4, it is possible to bring the filament or the brightest spot of the glass bulb of light source 2 into the optimum position as compared to the optical axis of the copying system.

The socket holder 4 is movable by a guiding part or nut 6 along a guiding unit, e.g. a lead screw 7 operatively connected with the guiding part 6, said lead screw 7 being mounted substantially parallel to the optical axis 21 of the condenser 20 and being rotatable by control knob 8 mounted on the front of the enlarging apparatus. By the corresponding actuation of control knob 8, the socket holder 4 is moved along the lead screw 7 and thus changes the distance of the light source relative to the condenser.

A connecting unit mounted on the socket holder 4, e.g. a gripping unit 9 having a resilient construction, is in operative connection with a preferably round guide rod 10, which is mounted parallel to the lead screw 7 in the lamp housing 1 and is rotatable about two bearing points 10a eccentric to the longitudinal axis of guide rod 10, by means of a control knob 11 preferably mounted at the front of the enlarger alongside knob 8. By turning the guide rod 10, socket holder 4 and thus light source 2 are tilted about the axis of rotation produced by the lead screw 7. By a corresponding actuation of the control knob 11, a centering of the light source 2, therefore, is achieved relative to the optical axis of the condenser from the front of the apparatus, the centering movement of light source 2 occurring in a plane which is perpendicular to lead screw 7. Guide rod 10 may also have other shaped cross-sections such as tubular, instead of round.

A centering of the light source 2 may also be achieved if the rotational axis is not lead screw 7 but rather a rod (not illustrated) arranged parallel thereto, on which the socket holder 4 is movably attached.

The centering of light source 2 takes place in two steps:

With each lamp replacement light source 2 is positioned by corresponding rotation and longitudinal movement of lamp socket 5 in such a manner that the filament or the brightest surface of the glass bulb of light source 2 reaches the most advantageous position relative to optical axis 21 of the condenser 20. A sharp setting of this centering occurs after each distance change of light source 2 to the condenser by rotating guide rod 10 by means of its control knob 11.

Firmly connected with the socket holder is an indicating element 12, arranged in such a manner that it is visible from the outside through a slot-shaped opening 13, situated at the side of lamp housing 1. Along the slot-shaped opening 13 there is provided a measuring scale 14 equipped with reference numerals. The indicating system, consisting of indicator 12 and measuring scale 14, makes possible the coordination of the lamp position to the individual enlarging settings, e.g. by way of a calibrated tabulation provided with the required data. It is possible to eliminate the calibrated tabulation of the reference numerals on measuring scale 14 directly refer to factors of magnification.

In order to avoid light emergence through slot-shaped opening 13, a separating wall 15 is provided in lamp housing 1 containing a light-tight bellows seals 18 disposed within two receiving channels 16, 17 and connected with the socket holder 4. In this connection, receiving channels 16, 17 are bent and their legs are at such a distance from each other about bellows seals 18 that the tilting movement of the light source 2 is not obstructed.

The lamp-setting mechanism described is not limited to an illuminating system wherein the light radiated from the light source is deflected by a reflector, but rather it may be applicable, without essential changes, to all known illuminating systems wherein condensers are employed.

The optical axis of the condenser is understood to mean the effective optical axis. By the deflection of the path of rays by a reflector, as described in the exemplary embodiment, the optical axis is to be considered as, therefore, deflected by this mirror.

I claim:

1. An adjustable light source for a photograhic projector apparatus having a condenser illuminating system, comprising a condenser having an optical axis, a lamp having a characteristic profile, a holder within which the lamp is mounted, a housing, a longitudinal separating wall disposed within the housing whereby the housing is separated into longitudinal traversing mechanism and lamp-containing compartments, longitudinal traversing means being mounted in the longitudinal traversing compartment, the longitudinal traversing means comprising substantially parallel lead screw and guide rod mounted longitudinally parallel to each other in the longitudinal traversing compartment, a nut is connected to the holder and operatively engaged with the lead screw for longitudinally traversing the holder and light source towards and away from the condenser when the lead screw is rotated, a tilting control rotatably mounted on the housing, eccentric connecting means coupling the guide rod to the tilting control whereby rotation of the tilting control imparts an arcuate movement to the guide rod relative to the lead screw whereby the holder is adjustably angularly tilted relative to the lead screw, a slot in the separating wall, the lamp holder being disposed through the slot with one end thereof connected to the lead screw and guide rod and the other end thereof being disposed in communication with the lamp-containing compartment, resilient light sealing means mounted on the separating wall alongside the slot whereby light from the lamp is prevented from passing through the slot into the longitudinal traversing compartment and whereby the tilting movement of the holder is accommodated to permit the position of the lamp relative to the condenser to be precisely adjusted.

2. An adjustable light source as set forth in claim 1, wherein a socket is disposed in the holder for longitudinal and rotational movement about its axis whereby the light source may be adjusted to its optimum position.

3. An adjustable light source as set forth in claim 1, wherein an indicating element is connected to the holder, a slot-shaped opening is disposed in the housing, and the indicating element being visible to an operator outside of the housing through the slot-shaped opening.

4. An adjustable light source as set forth in claim 3, wherein a measuring scale incorporating reference indicia is mounted on the outside of the housing adjacent the slot-shaped opening.

5. An adjustable light source as set forth in claim 4, wherein the reference indicia directly refer to factors of magnification.

6. An adjustable light source as set forth in claim 1, wherein the resilient light sealing means comprises a bellows sealing means.

7. An adjustable light source as set forth in claim 6, wherein channels are disposed on the separating wall adjacent the slot and the bellows sealing means comprising bellows seals mounted in the channels.

* * * * *